(12) United States Patent
Blaesing

(10) Patent No.: US 7,728,272 B2
(45) Date of Patent: Jun. 1, 2010

(54) METHOD FOR OPERATING OF A PHOTOELECTRIC SENSOR ARRAY HAVING EXPOSURE INTERRUPTION TIME PERIODS

(75) Inventor: Frank Blaesing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 12/428,606

(22) Filed: Apr. 23, 2009

(65) Prior Publication Data

US 2009/0230288 A1    Sep. 17, 2009

Related U.S. Application Data

(63) Continuation of application No. PCT/EP2007/061776, filed on Oct. 31, 2007.

(30) Foreign Application Priority Data

Nov. 4, 2006    (DE)    ........................ 10 2006 052 059

(51) Int. Cl.
*H01L 27/00* (2006.01)
(52) U.S. Cl. ................................. 250/208.1; 250/214 R
(58) Field of Classification Search .............. 250/208.1, 250/214 R, 214.1, 237 R; 348/316–322, 348/241–243, 274; 355/53, 55
See application file for complete search history.

(56) References Cited

U.S. PATENT DOCUMENTS

| 5,748,303 A | 5/1998 | Korta et al. |
| 6,175,383 B1 | 1/2001 | Yadid-Pecht et al. |
| 6,628,332 B1 * | 9/2003 | Watanabe .................... 348/322 |
| 7,038,820 B1 | 5/2006 | Kindt et al. |
| 2002/0141002 A1 | 10/2002 | Takano et al. |
| 2003/0095189 A1 | 5/2003 | Liu et al. |
| 2004/0246470 A1 | 12/2004 | Burns et al. |
| 2006/0017837 A1 | 1/2006 | Sorek et al. |
| 2006/0157760 A1 | 7/2006 | Hayashi et al. |
| 2008/0170848 A1 | 7/2008 | Wernersson |

FOREIGN PATENT DOCUMENTS

| EP | 1 677 514 A2 | 7/2006 |
| EP | 1701 536 A1 | 9/2006 |

\* cited by examiner

*Primary Examiner*—Que T Le
(74) *Attorney, Agent, or Firm*—Brooks Kushman P.C.

(57) ABSTRACT

A method for operating a sensor array of pixels which each generate a content corresponding to light incident thereon over an exposure period includes the following operations. The pixels are arranged into first and second regions and are reset such that the contents are cleared. The pixels are then exposed to receive light for a first exposure period. The exposure is then interrupted during which the content of each pixel in the first region is read. The pixels are then exposed to receive light for a second exposure period. The exposure is then interrupted during which the content of each pixel in the second region is read. The exposing and interrupting are performed without resetting the pixels such that the read content of each first region pixel depends on the first exposure period and the read content of each second region pixel depends on the first and second exposure periods.

20 Claims, 1 Drawing Sheet

METHOD FOR OPERATING OF A PHOTOELECTRIC SENSOR ARRAY HAVING EXPOSURE INTERRUPTION TIME PERIODS

CROSS-REFERENCE TO RELATED APPLICATIONS

This application is a continuation-in-part of International Application PCT/EP2007/061776, published in German, with an international filing date of Oct. 31, 2007, which claims priority to DE 10 2006 052 059.9, filed Nov. 4, 2006; the disclosures of which are both hereby incorporated by reference.

BACKGROUND OF THE INVENTION

1. Field of the Invention

The present invention relates to operating a photoelectric sensor array having photoelectric converter elements and a shutter for controlling the exposure of the converter elements.

2. Background Art

A photoelectric sensor array includes photoelectric converter elements. Each converter element generates an electric signal corresponding to the magnitude of light striking the converter element and the exposure time during which the light strikes converter element. Thus, each converter element forms a single image point or pixel. The converter elements are freely-addressable and readable. As such, the electric signal generated by any particular converter element can be read. Likewise, an electric signal corresponding to the electric signals generated by two or more of any particular converter elements can be generated and read. The exposure of any particular converter element to light striking the converter element may be controlled by a shutter.

Such a sensor array is used, for example, in camera systems in automotive applications that record images of an environment. The recorded images are reproduced, for example, by image analysis responses, or the image sequences are stored. An area of application for such a sensor array is automotive driver assistance systems having different goals such as track recognition or traffic signal recognition.

Typically, the converter elements of a sensor array are associated with groups. The groups of converter elements are allocated to respective imaging tasks. For instance, a first group of converter elements is to receive light from a first light source and a second group of converter elements is to receive light from a second light source. In turn, an electric signal corresponding to the electric signals generated by the first group of converter elements in response to the light from the first light source striking these converter elements is generated and read. Likewise, an electric signal corresponding to the electric signals generated by the second group of converter elements in response to the light from the second light source striking these converter elements is generated and read. As such, each group of converter elements is a targeted partial region or image region of the sensor array. These regions (i.e., regions of interest) are respectively allocated to one of a multiplicity of different tasks or functions. However, these regions may be allocated to different tasks even though the regions are to receive light from the same light source. In any event, in operation, the entire converter elements of the sensor array are reset after each reading process, i.e., the contents of all converter elements are cleared. A problem is that different image regions may sometimes have very different brightness values (i.e., very different electric signals) and this must be taken into consideration for the different functions handled by the image regions.

Known semiconductor sensors can separate the attainable signal deviation of a converter element (i.e., pixel) into partial sections of linear characteristic curves having different slopes. This enables higher order dynamics to be represented through the signal deviation of the pixel. These multiple segmented characteristic curves are valid for the entire image sensor, and limit the attainable signal deviation for each segment of the characteristic.

SUMMARY OF THE INVENTION

An object of the present invention is operating a photoelectric sensor array in such a manner that the attainable dynamics between different regions is improved significantly within an image without requiring a large additional hardware expenditure.

In carrying out the above object and other objects, the present invention provides a method for operating a sensor array having photoelectric converter elements. Each converter element generates a content corresponding to light incident thereon over an exposure time period in which the converter element is exposed to the light. The method includes arranging the converter elements into at least first and second image regions such that the first image region includes at least one of the converter elements and the second image region includes at least one other of the converter elements. Each converter element is reset at an initial time such that the contents of the converter elements are cleared. The converter elements are exposed to receive light for a first exposure time period after the initial time. The exposure of the converter elements to the light is interrupted for a first interruption time period after the first exposure time period. The content of each converter element in the first image region is read during the first interruption time period. The converter elements are exposed to receive the light for a second exposure time period after the first interruption time period. The exposing, interrupting, and reading steps performed from the beginning of the first exposure time period to the end of the second exposure time period are performed without resetting the converter elements. The read content of each converter element in the first image region corresponds to the light incident thereon over the first exposure time period.

The method may further include interrupting the exposure of the converter elements to the light for a second interruption time period after the second exposure time period, and reading the content of each converter element in the second image region during the second interruption time period. In this case, the exposing, interrupting, and reading steps performed from the beginning of the first exposure time period to the end of the second interruption time period are performed without resetting the converter elements. The read content of each converter element in the second image region corresponds to the light incident thereon over the first and second exposure time periods.

The method may further include exposing the converter elements to receive the light for a third exposure time period after the second interruption time period; interrupting the exposure of the converter elements to the light for a third interruption time period after the third exposure time period; and reading the content of each converter element in a third image region during the third interruption time period. In this case, the exposing, interrupting, and reading steps performed from the beginning of the first exposure time period to the end of the third interruption time period are performed without resetting the converter elements. The read content of each converter element in the third image region corresponds to light incident thereon over the first, second, and third exposure time periods.

The present invention also provides an associated sensor array assembly.

A method of operating a photoelectric sensor array having photoelectric converter elements in accordance with embodiments of the present invention includes the following operations. Initially, the content (i.e., electric signal, electric charge, etc.) of each converter element is reset or cleared at an initial time. The content of a converter element corresponds to the light applied to the converter element over a time period (i.e., exposure time) when such light is applied to the converter element. As such, the contents of the converter elements in a group of converter elements correspond to the light applied to these converter elements during the exposure time when such light is applied to these converter elements.

The converter elements are exposed to light striking the converter elements during a first exposure period after the initial time (i.e., after the contents of the converter elements have been reset). A global shutter interrupts the exposure of the converter elements to the light immediately after the first exposure period. The shutter interrupts the exposure of the converter elements to the light for the duration of a first exposure pause. The contents of the converter elements in a first group of converter elements are read during the first exposure pause. In this case, the exposure time of the converter elements in the first group of converter elements to light striking these converter elements is the first exposure period. As such, the contents of the converter elements in the first group correspond to the light applied to these converter elements during the first exposure period.

The converter elements are then again exposed to the light striking the converter elements during a second exposure period after the first exposure pause without the converter elements being deleted. The shutter interrupts the exposure of the converter elements to the light immediately after the second exposure period for the duration of a second exposure pause. The contents of the converter elements in a second group of converter elements are read during the second exposure pause. In this case, the exposure time of the converter elements in the second group to light striking these converter elements is the first exposure period and the second exposure period. As such, the contents of the converter elements in the second group correspond to the light applied to these converter elements during the first and second exposure periods.

Accordingly, a method of operating a sensor array having photoelectric converter elements in accordance with embodiments of the present invention is based on the concept of splitting the converter elements of the sensor array into non-overlapping regions such that each of these regions can be exposed with individual exposure periods which at least partially overlap.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
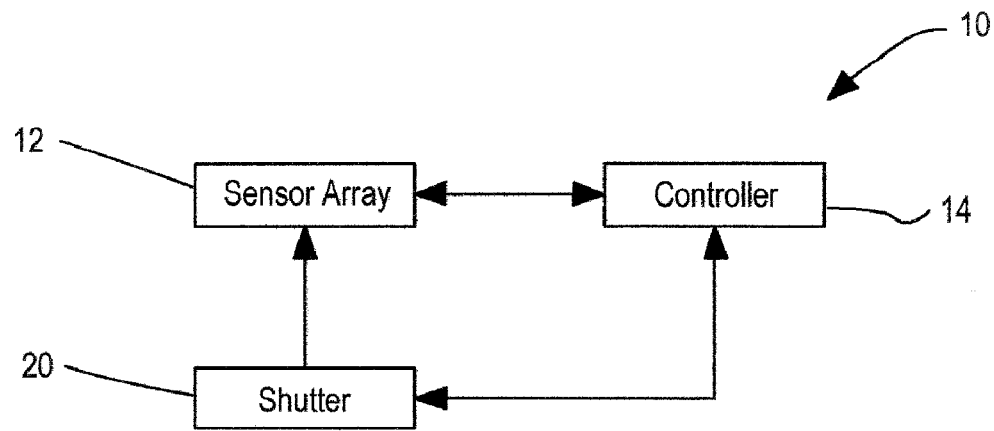
FIG. 1 illustrates a block diagram of a sensor array assembly for use with a method in accordance with embodiments of the present invention.
Figure 2:
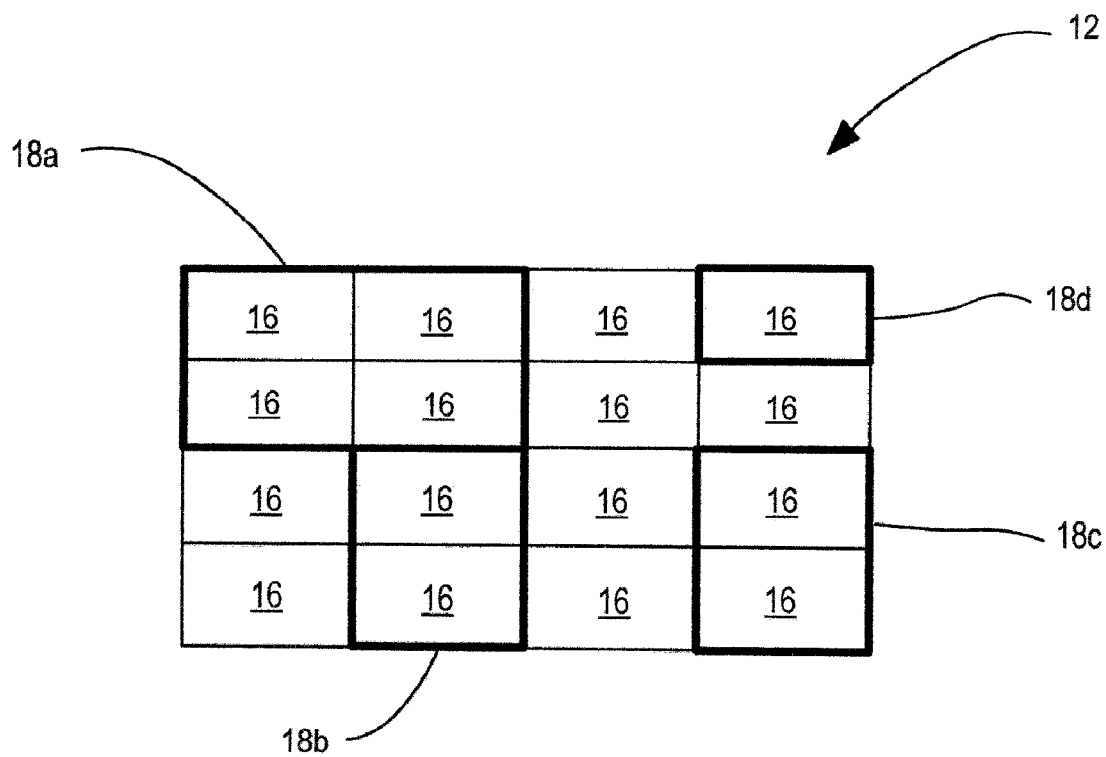
FIG. 2 illustrates a top schematic view of the sensor array of the sensor array assembly in which the converter elements of the sensor array are grouped into different regions.

Referring now to FIGS. 1 and 2, a sensor array assembly 10 for use with a method in accordance with embodiments of the present invention will be described. Assembly 10 includes a sensor array 12 and a controller 14. Sensor array 12 includes a plurality of photoelectric converter elements 16 (i.e., pixels) arranged in a two-dimensional array. Each converter element 16 generally includes a photodiode and a reset transistor operable to reset the converter element prior to the beginning of an image capture. During an image capture, each converter element 16 converts incident light into electric current for the duration in which the converter element is exposed to the light (i.e., an exposure time period). An output indicative of a charge (e.g., a voltage) based on the electric current generated by each converter element 16 during the exposure time period may be read out of the converter element. That is, each converter element 16 is adapted to photoelectrically convert light incident thereon during an exposure time period and transfer signal charges accumulated according to the amount of incident light to controller 14.

Controller 14 is operable to read the output of each converter element 16 and to send signals (such as electronic shutter control signals) to sensor array 12 in order to control the operation of the converter elements. Each converter element 16 has an address defined by its column and row in sensor array 12. A single row (or column) forms a linear sensor array and multiple rows (or columns) form a two-dimensional sensor array. Controller 14 is operable to define the pixel addresses to be read, making it possible to read the outputs of converter elements 16 within regions of interest or image regions. For example, as shown in FIG. 2, certain converter elements 16 of sensor array 12 are grouped into image regions 18a, 18b, 18c, and 18d. Image regions 18a, 18b, and 18c include two or more converter elements 16, image regions 18a and 18b have a common converter element 16, image regions 18c and 18d do not have any common converter elements 16, and image region 18d includes just one converter element 16.

Assembly 10 further includes a global shutter (i.e., a global enclosure device) 20. Shutter 20 is operable for controlling the exposure of converter elements 16 to light incident on the converter elements. That is, shutter 20 is operable to expose converter elements 16 to light incident on the converter elements during a given time period and to interrupt the exposure of the converter elements to the light during another time period in which the time periods are separated from one another. Controller 14 is operable to control the operation of shutter 20 to expose and interrupt the exposure of converter elements 16. Although shutter 20 is shown as a mechanical component arranged relative to sensor array 12, it is understood that controller 14 may provide the function of shutter 20 with an electronic shutter function.

The operation of a method (i.e., image acquisition process) in accordance with embodiments of the present invention for operating sensor array 12 generally includes the following:

reset all converter elements (pixels) 16 at an initial time; that is, the content or charge of each converter element for output to controller 14 is reset or cleared (for example, controller 14 controls all pixels 16 to reset at the initial time);

expose all pixels 16 for a first exposure period t1 (for example, controller 14 controls shutter 20 to have the shutter enable all pixels 16 to be exposed to incident light for the first exposure period t1);

stop the exposure of all pixels 16 using shutter 20 for a first exposure pause (for example, controller 14 controls shutter 20 to have the shutter interrupt the exposure of all pixels 16 from the incident light for the first exposure pause);

read the output of pixels 16 of first image region 18a during the first exposure pause (total exposure time of pixels 16 of first image region 18s is the first exposure period t1) (for example, controller 14 receives the output of pixels 16 of first image region 18a);

expose all pixels 16 for a second exposure period t2;

stop the exposure of all pixels 16 using shutter 20 for a second exposure pause;

read the output of pixels 16 of second image region 18b during the second exposure pause (total exposure time of pixels 16 of second image region 18b is the first exposure period t1 and the second exposure period t2 (i.e., the total exposure time is t1+t2));

expose all pixels 16 for a third exposure period t3;

stop the exposure of all pixels 16 using shutter 20 for a third exposure pause;

read the output of pixels 16 of third image region 18c during the third exposure pause (total exposure time of pixels 16 of third image region 18c is the first exposure period t1, the second exposure period t2, and the third exposure period t3 (i.e., the total exposure time is t1+t2+t3));

expose all pixels 16 for a fourth exposure period t4;

stop the exposure of all pixels 16 using shutter 20 for a fourth exposure pause;

read the output of pixels 16 of fourth image region 18d during the fourth exposure pause (total exposure time of pixels 16 of fourth image region 18c is the first exposure period t1, the second exposure period t2, the third exposure period t3, and the fourth exposure period t4 (i.e., the total exposure time is t1+t2+t3+t4)); and repeat the above operation for a new image acquisition process.

In the method, no reset action is carried out for any of converter elements 16 between the individual partial exposures such that the converter elements which have not yet been read continue to be exposed from the state in which they had been frozen by shutter 20. The method has an advantageous design in which the exposure starts at the same instant for all regions of interest and ends after different exposure times (t1, t1+t2, t1+t2+t3, etc.).

The method can be reduced to accommodate only two or three image regions and can be extended to accommodate more than four image regions. In the latter case, longer exposure times such as t1+t2+t3+t4+t5, t1+t2+t3+t4+t5+t6, etc., are used.

The resulting total time for a read process in the method includes the duration of the longest exposure period and the individual read times of the image regions, which represents an immense time advantage compared to a standard sequential procedure in which all image regions are exposed sequentially, with the exposure period provided for a specific image region, followed by the reading of the respective specific image region.

Due to the insertion of exposure pauses by shutter 20, during which pixels 16 of one or a plurality of regions of interest are read, this function can be enabled with only slight modifications in the standard sensor array architecture.

The function of shutter 20 may be implemented as a global electronic shutter by stopping the exposure during the read process of a partial region, as is already done for image sensors.

A possible alternative to this approach in which a further exposure of the other image regions occurs during the reading of a selected image region uses a local shutter that is addressable in the image region to be read, which increases the complexity of the circuit.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of present the invention.

What is claimed is:

1. A method for operating a sensor array having a plurality of photoelectric converter elements, wherein each converter element generates a content corresponding to light incident thereon over an exposure time period in which the converter element is exposed to the light, the method comprising:

arranging the converter elements into at least first and second image regions such that the first image region includes at least one of the converter elements and the second image region includes at least one other of the converter elements;

resetting each converter element at an initial time such that the contents of the converter elements are cleared;

exposing the converter elements to receive light for a first exposure time period after the initial time;

interrupting the exposure of the converter elements to the light for a first interruption time period after the first exposure time period;

reading the content of each converter element in the first image region during the first interruption time period; and exposing the converter elements to receive the light for a second exposure time period after the first interruption time period;

wherein the exposing, interrupting, and reading steps performed from the beginning of the first exposure time period to the end of the second exposure time period are performed without resetting the converter elements.

2. The method of claim 1 wherein:

the read content of each converter element in the first image region corresponds to the light incident thereon over the first exposure time period.

3. The method of claim 1 further comprising:

interrupting the exposure of the converter elements to the light for a second interruption time period after the second exposure time period; and reading the content of each converter element in the second image region during the second interruption time period;

wherein the exposing, interrupting, and reading steps performed from the beginning of the first exposure time period to the end of the second interruption time period are performed without resetting the converter elements.

4. The method of claim 3 wherein:

the read content of each converter element in the second image region corresponds to the light incident thereon over the first and second exposure time periods.

5. The method of claim 4 further comprising:

exposing the converter elements to receive the light for a third exposure time period after the second interruption time period;

interrupting the exposure of the converter elements to the light for a third interruption time period after the third exposure time period; and reading the content of each converter element in a third image region during the third interruption time period;

wherein the exposing, interrupting, and reading steps performed from the beginning of the first exposure time period to the end of the third interruption time period are performed without resetting the converter elements.

6. The method of claim 5 wherein:

the read content of each converter element in the third image region corresponds to light incident thereon over the first, second, and third exposure time periods.

7. The method of claim 1 wherein:

the content of each converter element is an electric charge.

8. The method of claim 1 wherein:

the steps of exposing the converter elements to receive light and interrupting the exposure of the converter elements to the light is done using a shutter.

9. The method of claim 8 wherein:

the shutter includes at least one of a mechanical shutter and an electronic shutter.

10. The method of claim 1 wherein:

at least one of the first and second image regions includes a spatially contiguous group of the converter elements.

11. An assembly comprising:

a sensor array having a plurality of photoelectric converter elements, wherein each converter element generates a content corresponding to light incident thereon over an exposure time period in which the converter element is exposed to the light, wherein the converter elements are into at least first and second image regions such that the first image region includes at least one of the converter elements and the second image region includes at least one other of the converter elements;

a controller configured to reset each converter element at an initial time such that the contents of the converter elements are cleared;

wherein the controller is further configured to, without resetting the converter elements, expose the converter elements to receive light for a first exposure time period after the initial time, interrupt the exposure of the converter elements to the light for a first interruption time period after the first exposure time period, read the content of each converter element in the first image region during the first interruption time period, and expose the converter elements to receive the light for a second exposure time period after the first interruption time period.

12. The assembly of claim 11 wherein:

the read content of each converter element in the first image region corresponds to the light incident thereon over the first exposure time period.

13. The assembly of claim 11 wherein:

the controller is further configured to, without resetting the converter elements, interrupt the exposure of the converter elements to the light for a second interruption time period after the second exposure time period, and read the content of each converter element in the second image region during the second interruption time period.

14. The assembly of claim 13 wherein:

the read content of each converter element in the second image region corresponds to the light incident thereon over the first and second exposure time periods.

15. The assembly of claim 13 wherein:

the controller is further configured to, without resetting the converter elements, expose the converter elements to receive the light for a third exposure time period after the second interruption time period, interrupt the exposure of the converter elements to the light for a third interruption time period after the third exposure time period, and read the content of each converter element in a third image region during the third interruption time period.

16. The assembly of claim 15 wherein:

the read content of each converter element in the third image region corresponds to light incident thereon over the first, second, and third exposure time periods.

17. The assembly of claim 11 wherein:

the content of each converter element is an electric charge.

18. The assembly of claim 11 further comprising:

a shutter, wherein the controller is operable to control the shutter in order to expose the converter elements to receive light and to interrupt the exposure of the converter elements to the light.

19. The assembly of claim 18 wherein:

the shutter includes at least one of a mechanical shutter and an electronic shutter.

20. The assembly of claim 11 wherein:

at least one of the first and second image regions includes a spatially contiguous group of the converter elements.

* * * * *